March 17, 1942.   M. ZAIGER   2,276,556
WINDSHIELD WIPER
Filed Dec. 29, 1939
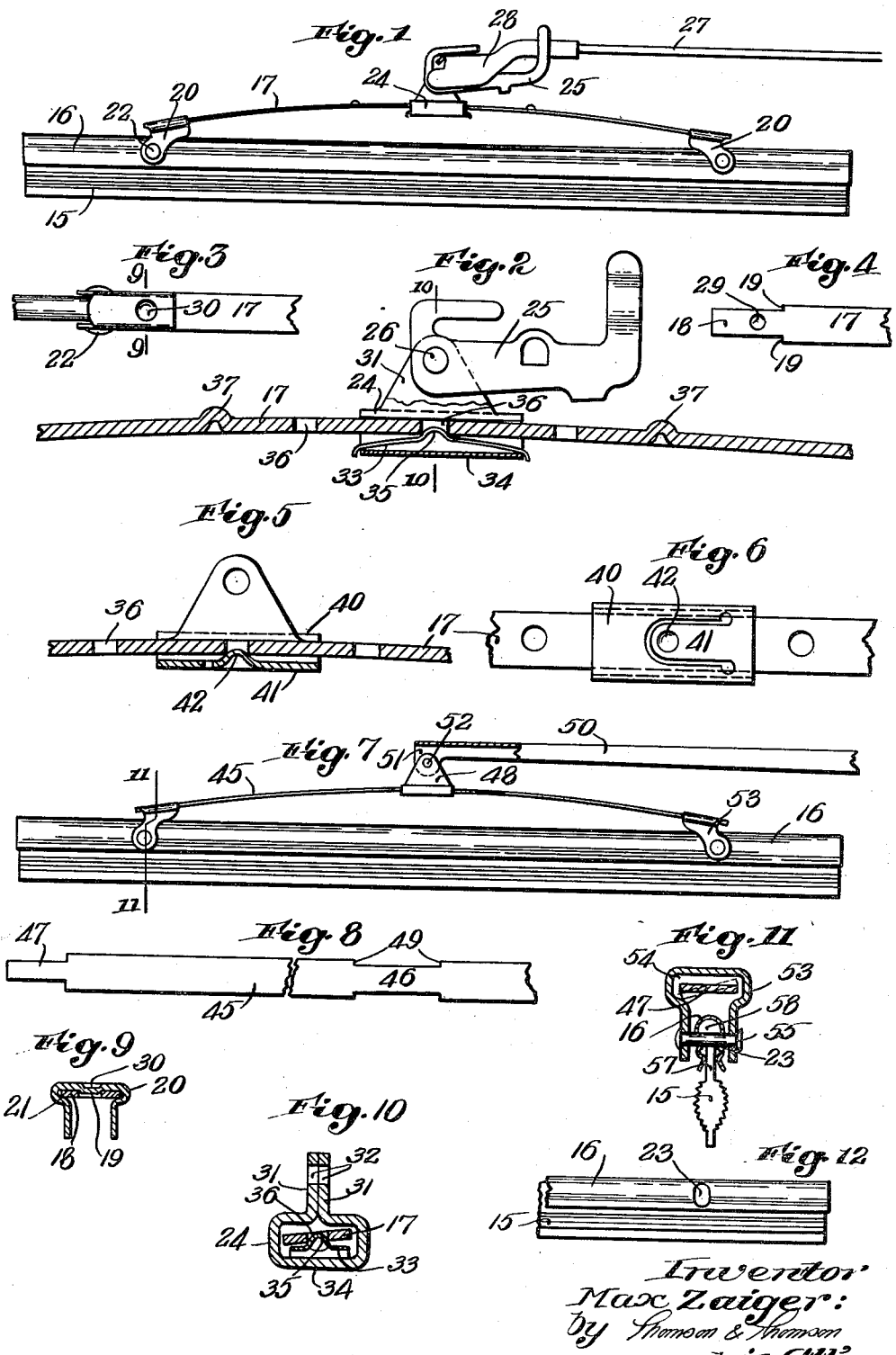
Inventor
Max Zaiger:
by Thomson & Thomson
his Attys.

Patented Mar. 17, 1942

2,276,556

UNITED STATES PATENT OFFICE 2,276,556

WINDSHIELD WIPER

Max Zaiger, Swampscott, Mass.

Application December 29, 1939, Serial No. 311,569

6 Claims. (Cl. 15—250)

This invention relates to windshield wipers, and pertains more particularly to attachments for connecting a wiper arm to a wiper blade, comprising a yoke of the general type shown in the Stadeker Patent No. 1,510,509 (which I own), and in my Patent No. 2,149,037. This application is a continuation in part of my co-pending application Serial No. 265,649, filed April 3, 1939, and issued as Patent No. 2,206,343.

The principal purposes of the present invention are to provide a bowed yoke connector which is fixed at both ends to the wiper blade, preferably by pivot members passing through enlarged holes or slots in the blade holder so that the blade is permitted to move or rock angularly with respect to the yoke but is restrained from endwise movement relative thereto; to provide a yoke member formed of a flat, thin and narrow strip of sheet metal which may be stamped out in various lengths without appreciable loss of material, and which is equipped with separate attachments comprising a clip or carriage for connecting the yoke to the wiper arm, and saddle members for connecting the ends of the yoke to the wiper blade; to provide a clip or carriage which is slidable along the yoke to several adjusted positions, and which is preferably so constructed as to permit resiliently controlled, transverse rocking movement relative to the yoke; and to provide for transverse rocking movement between said saddle members and the yoke.

These and other structural features of the improved windshield wiper contribute to simplicity and economy in manufacture, durability in use, efficiency in operation, and adaptability of attachment to various types of wiper arms and wiper blades. Recommended embodiments of the invention are illustrated in the accompanying drawing, but it will be understood that the structural details herein shown and described may be varied to suit particular purposes or conditions, without departing from the essence of this invention as set forth in the appended claims.

In the drawing—

Fig. 1 is a side elevation of a windshield wiper equipped with the improved attachments;

Fig. 2 is a side view, partly in longitudinal section, of the central portion of the yoke member shown in Fig. 1, with the clip carriage and clip in one adjusted position;

Fig. 3 is a fragmentary plan view showing a saddle member attached to the yoke and connected to the blade holder;

Fig. 4 is a fragmentary plan view of the end of the yoke, forming part of Fig. 3;

Fig. 5 is a view similar to Fig. 2 showing a modified form of clip carriage;

Fig. 6 is a bottom view of the apparatus shown in Fig. 5;

Fig. 7 is a view similar to Fig. 1 illustrating a modified form of clip and wiper arm;

Fig. 8 is a fragmentary plan view of the yoke member shown in Fig. 7;

Fig. 9 is a transverse section taken on line 9—9 of Fig. 3;

Fig. 10 is a transverse section taken on line 10—10 of Fig. 2;

Fig. 11 is a transverse section taken on line 11—11 of Fig. 7; and

Fig. 12 is a fragmentary elevation of one end of the wiper blade of Fig. 1 or 7, showing the enlarged slot for receiving the pivot pin which connects the yoke saddle thereto.

In the particular embodiment chosen for the purpose of illustration in Figs. 1 to 4, the windshield wiper apparatus comprises a wiper blade consisting of a flexible rubber wiper element or squeegee 15, and a sheet metal holder 16 having spaced sides between which the upper portion of the wiper element is retained; a bowed yoke member 17 consisting of a flat, thin and narrow strip of sheet metal which is preferably slightly flexible, said strip having a reduced or narrowed end portion 18 forming shoulders 19; a pair of saddle members 20 shaped to provide opposed channels 21 to receive the yoke ends 18, respectively, and depending ears straddling the blade holder 16 and pivotally connected thereto, respectively, by pins or rivets 22 passing through openings 23 (Fig. 12) in the sides of the holder 16 and in the rubber wiper 15; a clip carriage 24 embracing the central portion of the yoke 17, and preferably slidable longitudinally thereon; and a clip 25 (of the general character shown and described in my Patent No. 2,153,224) pivoted at 26 to the carriage 24. As explained, in my said patent, the clip 25 is adapted removably to connect wiper arms having variously shaped ends, a wiper arm 27 having a U-shaped end 28 being connected to the clip in Fig. 1.

Although the yoke ends 18 will be retained in the channels of the respective saddle members 20, under usual conditions, by the stiffness of the bowed yoke which normally forces the shoulders 19 against the ends of the respective saddles, the longitudinal position of the latter being fixed by the rivets 22 which hold the saddles in spaced relation, the yoke may be fastened to the respective saddles in the manner indicated in Fig. 9. In this optional arrangement, the yoke ends 18 are formed with a hole 29 and a button 30 of the saddle engages said hole to lock the parts together. The button may be conveniently formed by punching a portion of the saddle top downwardly into the hole 29.

Yoke strips of thin, flat metal as above described may be stamped in quantity from sheet stock without appreciable waste of material, and the arm connectors 24, 25 and saddle members 20 may be stamped separately from sheet stock. Hence, a yoke attachment comprising these assembled parts is much more economical to manufacture than a one piece yoke having an integral arm clip and integral saddles, such as disclosed in the Stadeker Patent No. 1,510,509. Furthermore, the Stadeker yoke must be used with wiper arms and blades of special character; whereas, the yoke attachments herein described will fit a variety of arms and blades. If any change is necessary, only the size or shape of the attached clip or saddles need be modified, in applicant's apparatus.

The clip carriage 24 consists of a small piece of sheet metal bent around the yoke and having juxtaposed upstanding ears 31 formed with aligned openings 32 which receive the rivet 26 pivotally connecting the clip 25 to the carriage. The carriage portion which embraces the yoke is preferably box-like in shape (Fig. 10) providing a channel deep enough to permit the carriage to slide longitudinally of the yoke and also to accommodate a spring member 33 between the bottom 34 of the carriage and the under side of the yoke strip 17. The spring has a central, struck up boss or detent 35, engageable in one of a series of openings 36 in the yoke, to hold the slidable carriage in adjusted position, longitudinally of the yoke; and said detent also constitutes a pivot or fulcrum on which the yoke may rock transversely within the carriage, under the yielding tension of the leaf spring 33. This rocking motion permits the wiper blade to tilt or flop at an angle to the windshield, as it is oscillated or reciprocated across the windshield by hand or motor operation of the wiper arm; and the rocking carriage may be employed to supplement the rocking motion provided at the connection between the saddles 20 and the wiper blade, either by providing the enlarged pivot hole 23 of Fig. 12, or by the optional connection hereinafter described in connection with Fig. 11.

The yoke may have struck up studs 37, or other stop members, for limiting the sliding movement of the carriage 24 on yoke 17; and it will be evident that the carriage is yieldingly held in adjusted position by the aforesaid engagement of the spring detent 35 in the yoke openings 36, which may be spaced at any desired distance. Such adjustment may be desired either to accommodate wiper arms of varying length, or to vary the pressure exerted on the wiper blades by the respective ends of the yoke, so that the rubber wiping element 15 will properly bear against the windshield during its oscillation. It will also be evident that the use of the yoke connection between the wiper arm and the wiper blade ensures that the pressure of the blade on the glass will be balanced and uniform throughout its length, as contrasted with the effect produced by the ordinary windshield wipers in which the wiper arm is attached at the center of the blade holder with the result that pressure is constantly imparted only at the central portion of the rubber wiper.

In the optional form shown in Figs. 5 and 6, the resilient element which serves to hold the carriage in adjusted position and to permit rocking movement of the yoke, is incorporated as a part of the carriage itself. In this form, the carriage 40 is made of flexible metal and the bottom thereof has a cut-out, resilient tongue 41 formed with an upstanding detent or button 42 which engages in the openings 36 of the yoke 17, substantially in the same manner and with the same effect as previously described. In this form as well as in the form shown in Fig. 2, the carriage may be bent around the yoke strip 17 or may be pre-formed and slid endwise onto the yoke.

In the further modification illustrated in Figs. 7, 8, and 11, the yoke strip 45 is formed with a narrowed center portion 46 as well as with narrowed ends 47. A clip 48, closely embracing the narrowed center portion 46 of the yoke and fixed in position between the shoulders 49, serves to connect a wiper arm directly to the yoke. The wiper arm 50 has an end formed with ears 51 which are pivoted to the clip 48 at 52. In this arrangement, the wiper arm is positively attached to the yoke, without any transverse play or rocking motion at the attachment, the desirable rocking feature being incorporated in the connections between the yoke ends and the blade holder 16.

In this case, each of the saddles 53 has a box-like channel 54 which loosely receives the narrowed end 47 of the yoke, so that said end may rock transversely within said channel (Fig. 11) and may also slide and rock longitudinally in the channel, as the saddle swings on the rivet 55 by which it is pivotally connected to the blade holder 16. In this arrangement, the saddles function somewhat like spring shackles equipped with double pivots. Additional transverse rocking motion between the blade holder and the saddle may be governed by the size of the holder openings 23 through which the rivet 55 passes; and it is evident that the latter feature may be employed with or without the rocking relationship between the saddle and the yoke end.

The spaced sides of the blade holder 16 are preferably crimped or corrugated longitudinally, to strengthen and stiffen the metal and also to hold the relatively thin flexible web 57 of the rubber wiping element 15; and the latter preferably has an enlarged rib 58 along its upper side which is embraced and retained by the upper end of the blade holder, as best shown in Fig. 11. It will be apparent that the rocking action provided at the connections between the yoke and the blade and/or the arm clip or carriage, are peculiarly advantageous when the rubber wiping element 15 has a thick, tapering head (such as shown in Fig. 11) which readily flops from side to side to present a broad cleaning surface to the windshield; but it will be understood that the attachments above described may be used for connecting any usual type of wiper blade to any usual or desired type of wiper arm.

I claim:

1. In a windshield wiper, a blade holder having spaced parallel sides for retaining a wiper element, a bowed yoke consisting of a relatively flat strip of sheet metal, saddle members connected to the end portions of the yoke and having ears straddling the blade holder, and means passing through said ears and blade holder to restrain relative longitudinal movement between the saddle members and the holder, the ends of the yoke being reduced in width to provide shoulders on opposite sides thereof, and each of said saddle members having sides formed with opposed channels receiving the respective ends of the yoke with the shoulders abutting the inner ends of the respective saddles, so that the yoke ends received in said channels are restrained from inward movement by said shoulders and from outward movement by the bowing of the yoke, the width of said channels limiting transverse movement of the yoke ends received therein.

2. In a windshield wiper, a blade holder having spaced parallel sides for retaining a wiper element, a bowed yoke consisting of a relatively flat strip of sheet metal, saddle members connected to the end portions of the yoke and having ears straddling the blade holder, and means passing through said ears and blade holder to restrain relative longitudinal movement between the saddle members and the holder, the ends of the yoke being reduced in width to provide shoulders on opposite sides thereof, and each of said saddle members having a channel receiving the respective ends of the yoke with the shoulders abutting the inner ends of the respective saddles, said channel being substantially larger than the yoke ends so that the yoke ends may move angularly therein to permit rocking motion of the saddle and blade relative to the yoke.

3. In a windshield wiper, a blade holder having spaced parallel sides for retaining a wiper element, a bowed yoke consisting of a relatively flat strip of sheet metal, saddle members connected to the end portions of the yoke and having ears straddling the blade holder, and means passing through said ears and blade holder to restrain relative longitudinal movement between the saddle members and the holder, the ends of the yoke being reduced in width to provide shoulders on opposite sides thereof, and each of said saddle members having a channel receiving the respective ends of the yoke with the shoulders abutting the inner ends of the respective saddles, each yoke end having an opening therein and each saddle having a button depressed into said opening to lock the parts together.

4. In a windshield wiper having a blade and a yoke member connectable at its opposite ends to the blade, a wiper arm attachment comprising a carriage embracing the yoke and slidable longitudinally thereof, and resilient means for holding the carriage in adjusted position, the yoke member consisting of a strip of relatively flat metal having openings therein and the resilient means having a detent selectively engageable in one of said openings.

5. In a windshield wiper having a wiper blade and a wiper arm, a bowed yoke member of relatively flat sheet metal connectable at its opposite ends to the blade and means applied to the central portion of the yoke for connecting the same to the wiper arm, said means comprising a carriage having a channel receiving the yoke, the depth of the channel being appreciably greater than the thickness of the yoke, so that the yoke is angularly movable therein, and the carriage having a resilient element bearing against the yoke between the sides thereof, thereby yieldingly to restrain such movement while permitting the yoke to be rocked transversely in the carriage when the wiper blade is oscillated over the windshield.

6. In a windshield wiper having a wiper blade and a wiper arm, a bowed yoke member of relatively thin and flat sheet metal connectable at its opposite ends to the wiper blade, and means applied to the central portion of the yoke for pivotally connecting a wiper arm thereto, said means comprising a carriage having a channel portion surrounding the yoke and a pair of juxtaposed, upstanding ears formed with openings for receiving a pivot pin, the depth of the channel being substantially greater than the thickness of the yoke, and a spring member disposed in said channel between the bottom of the channel and the underside of the yoke, said spring having a detent bearing against the yoke between the sides thereof, whereby the yoke is movable angularly within the channel so that it rocks transversely in the carriage when the wiper blade is oscillated on the windshield.

MAX ZAIGER.